United States Patent
Copp et al.

(10) Patent No.: US 6,347,785 B1
(45) Date of Patent: Feb. 19, 2002

(54) UNIVERSAL QUICK-DISCONNECT COUPLING AND VALVE

(75) Inventors: Donald G. Copp, Mt. Gilliad; Samuel N. Davis, Dublin; James W. Johnson, Delaware; M. Stephen Tschanen, Marysville, all of OH (US)

(73) Assignee: Liqui-Box Corporation, Worthington, OH (US)

( * ) Notice: Subject to any disclaimer, the term of this patent is extended or adjusted under 35 U.S.C. 154(b) by 0 days.

(21) Appl. No.: 09/587,470

(22) Filed: Jun. 5, 2000

Related U.S. Application Data

(60) Provisional application No. 60/137,545, filed on Jun. 4, 1999.

(51) Int. Cl.[7] ............... F16L 29/04; F16L 37/28
(52) U.S. Cl. .............. 251/149.6; 137/614.04; 137/269; 141/346
(58) Field of Search ................ 251/149.6, 149.4, 251/149.1; 137/614.04, 269, 271; 141/346, 348, 349; 285/12

(56) References Cited

U.S. PATENT DOCUMENTS

| | | | | |
|---|---|---|---|---|
| 4,266,813 A | * | 5/1981 | Oliver .................... 285/12 |
| 4,445,551 A | * | 5/1984 | Bond et al. ................ 141/349 |
| 4,696,326 A | * | 9/1987 | Sturgis ................ 137/614.04 |
| 4,862,918 A | * | 9/1989 | Schroeder ............ 251/149.4 X |
| 5,031,662 A | * | 7/1991 | Roethel ............... 251/149.6 X |
| 5,375,887 A | * | 12/1994 | Johnson ..................... 285/12 |
| 5,546,978 A | * | 8/1996 | Parker .................... 285/12 X |
| 5,609,195 A | * | 3/1997 | Stricklin et al. ........... 141/346 |
| 5,884,648 A | * | 3/1999 | Savage ............. 137/614.04 X |
| 5,901,761 A | * | 5/1999 | Rutter et al. .............. 141/346 |

\* cited by examiner

Primary Examiner—Joseph A. Kaufman
Assistant Examiner—Eric Keasel
(74) Attorney, Agent, or Firm—Vorys, Sater, Seymour and Pease LLP

(57) ABSTRACT

A single-service package coupling and valve includes a fitment having a spout and a sliding tubular valve member mounted therein for receiving a cooperating dispensing connector of a liquid distributing and dispensing system, and an external adapter ring designed to cooperate with the mounting mechanisms of a plurality of conventional commercially available dispensing connectors. An internal adapter sleeve is mounted within the sliding tubular valve member to provide a tight seal with any of the conventional dispensing connectors.

9 Claims, 20 Drawing Sheets

UNIVERSAL QUICK-DISCONNECT COUPLING AND VALVE

RELATIONSHIP TO OTHER APPLICATIONS

This application claims the benefit of the priority of copending Provisional Application Ser. No. 60/137,545, filed Jun. 04, 1999.

BACKGROUND OF THE INVENTION

1. Field of the Invention

The present invention deals with a quick-disconnect coupling and valve assembly which is especially useful, but not limited to, the dispensing of liquids and semi-liquids from a collapsible bag of a bag-in-box package by various syrup dispensing systems.

2. Brief Description of the Prior Art

Various systems are in use or have been proposed for dispensing beverage syrup from a disposable package consisting of a flexible collapsible bag in a corrugated box commonly referred to as a bag-in-box dispensing package. One such system capable of use with the bag-in-box is illustrated in U.S. Pat. No. 4,014,461. The bag is provided with a fitment in the form of a spout through which filling and dispensing occurs, and it is desirable to provide a quick-disconnect coupling between the spout and the service line of the pump or other type of beverage mixing and dispensing system. One such coupling is carried on the spout fitment of the bag and works in conjunction with the service line connector, and is commonly called in the art a single-service valve and coupling since it is discarded with the bag when it is emptied. This valve opens automatically as the line connector is connected to the spout and closes as it is disconnected therefrom to prevent syrup from draining from the bag. Such a single-service valve is illustrated in U.S. Pat. No. 4,286,636, which shows it in combination with a dip tube. However, it is of such a nature, including a coil or equivalent spring arrangement for closing the valve, that it is expensive to produce and after use over a period of time, has a tendency to weaken and to become clogged with the sticky syrup and, therefore, does not always automatically close to prevent drainage from the bag. Another quick-disconnect coupling is disclosed in U.S. Pat. No. 4,445,551, but that coupling is dedicated to only one type of currently known service line connection.

SUMMARY OF THE INVENTION

The present invention deals with a universally applicable single-service coupling and valve assembly which is fitted to the fitment or spout of a flexible bag in cooperation with a service line connector similar member. This connector may be used in a beverage pumping system, but it could also be used as a connector in a different context.

The single-service coupling and valve assembly according to this invention comprises a spout or fitment and a tubular valve member mounted therein for receiving a cooperating probe of a conventional liquid dispensing apparatus. The tubular valve member, or slider, is capable of axial frictional sliding movement within the spout. The spout is generally similar to bag spouts now in common use which cooperate with the usual filling and dispensing machines, etc. However, the spout is provided with certain structural features for cooperating with the a plurality of different dispensing connectors, including those most commonly used. The tubular valve member or slider may also be provided with an internal adapter ring for accepting a plurality of filling apparatus connectors.

Accordingly, it is an object of the invention to provide a universal single-service coupling and valve assembly that can be used with several conventional coupling systems.

A further object is to provide a single-service coupling and valve assembly that may be manufactured economically.

Further objects of the invention will become apparent from the description of the invention which follows.

DETAILED DESCRIPTION OF THE INVENTION AND PREFERRED EMBODIMENTS

In liquid dispensing apparatus such as is used to dispense individual servings of beverages and the like, the syrups, flavorings and other ingredients are frequently supplied in collapsible containers enclosed and shipped within an outer container ("bag-in-box"). The shipping package or container is provided with a fitment that accepts a probe that is part of the dispensing apparatus in order to connect the supply of liquid to the dispensing apparatus. The fitment generally contains a valve that is actuated by the insertion of the probe of the dispensing apparatus in order to allow the liquid to flow into the dispensing apparatus. The fitment attached to the liquid container is generally termed a package connector and the probe or similar device on the dispensing apparatus that interacts with the package connector is generally termed a dispensing connector.

The invention will be illustrated by reference to the drawings which illustrate a preferred embodiment thereof.

Figure 1:
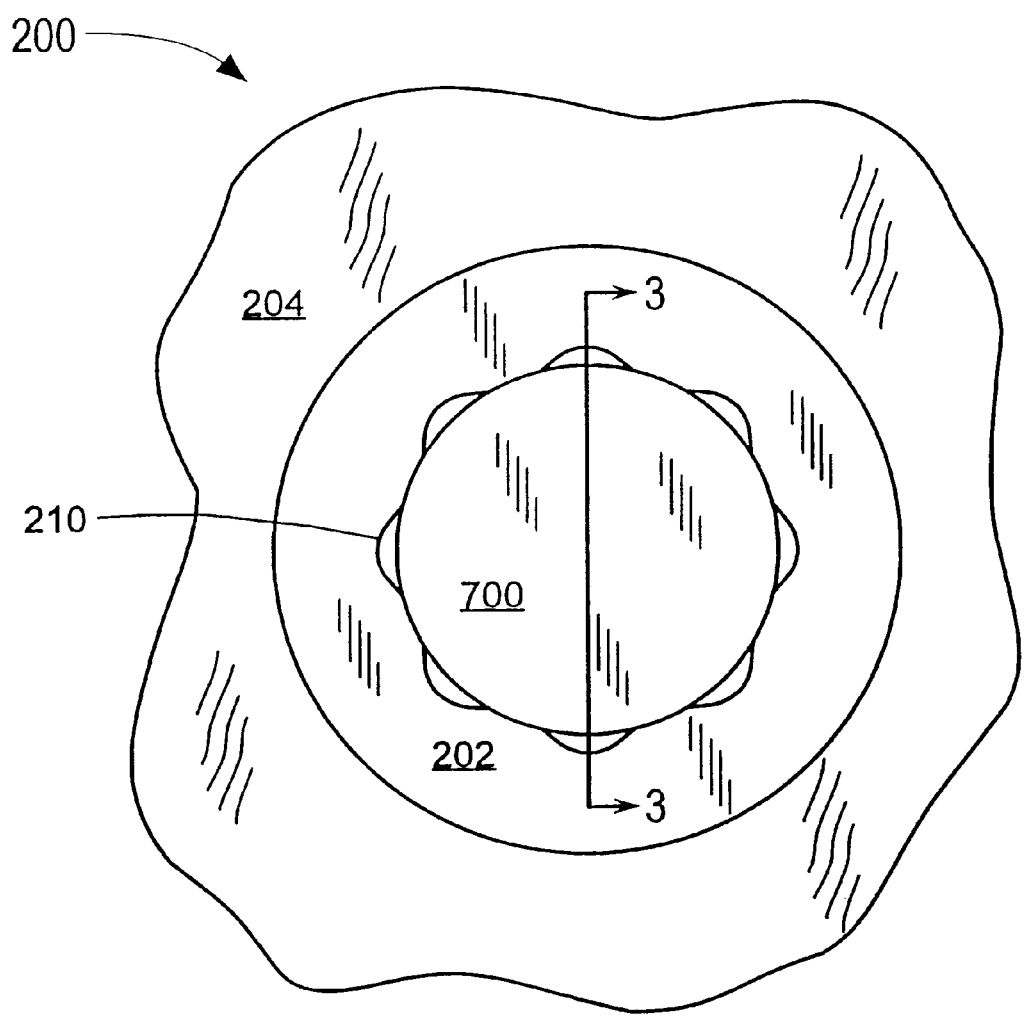
FIG. 1 illustrates a front elevational view of the single-service coupling of the invention with the protective cap in place.
Figure 2:
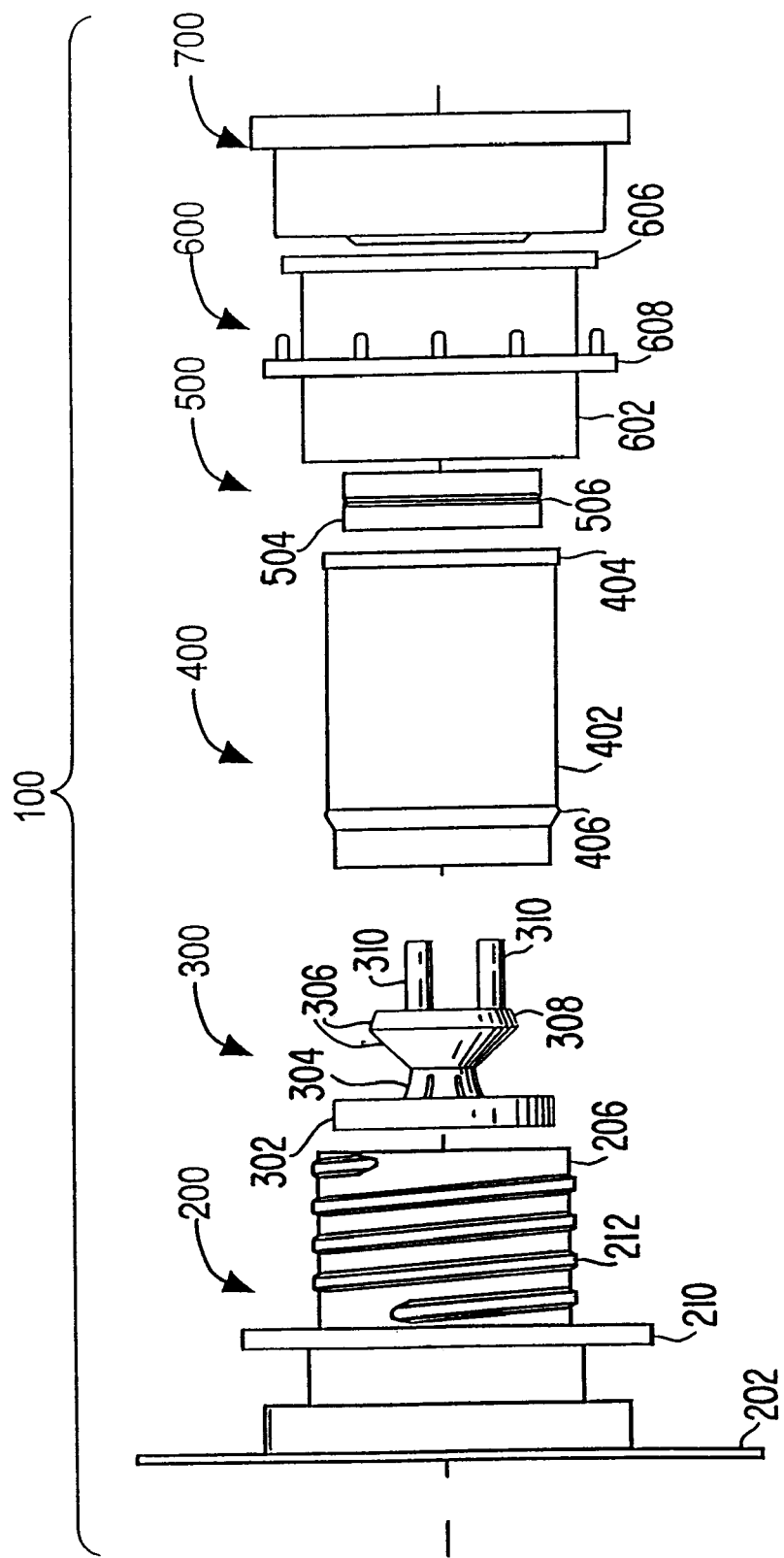
FIG. 2 is an exploded side elevational view of the single-service coupling of the invention.
Figure 3:
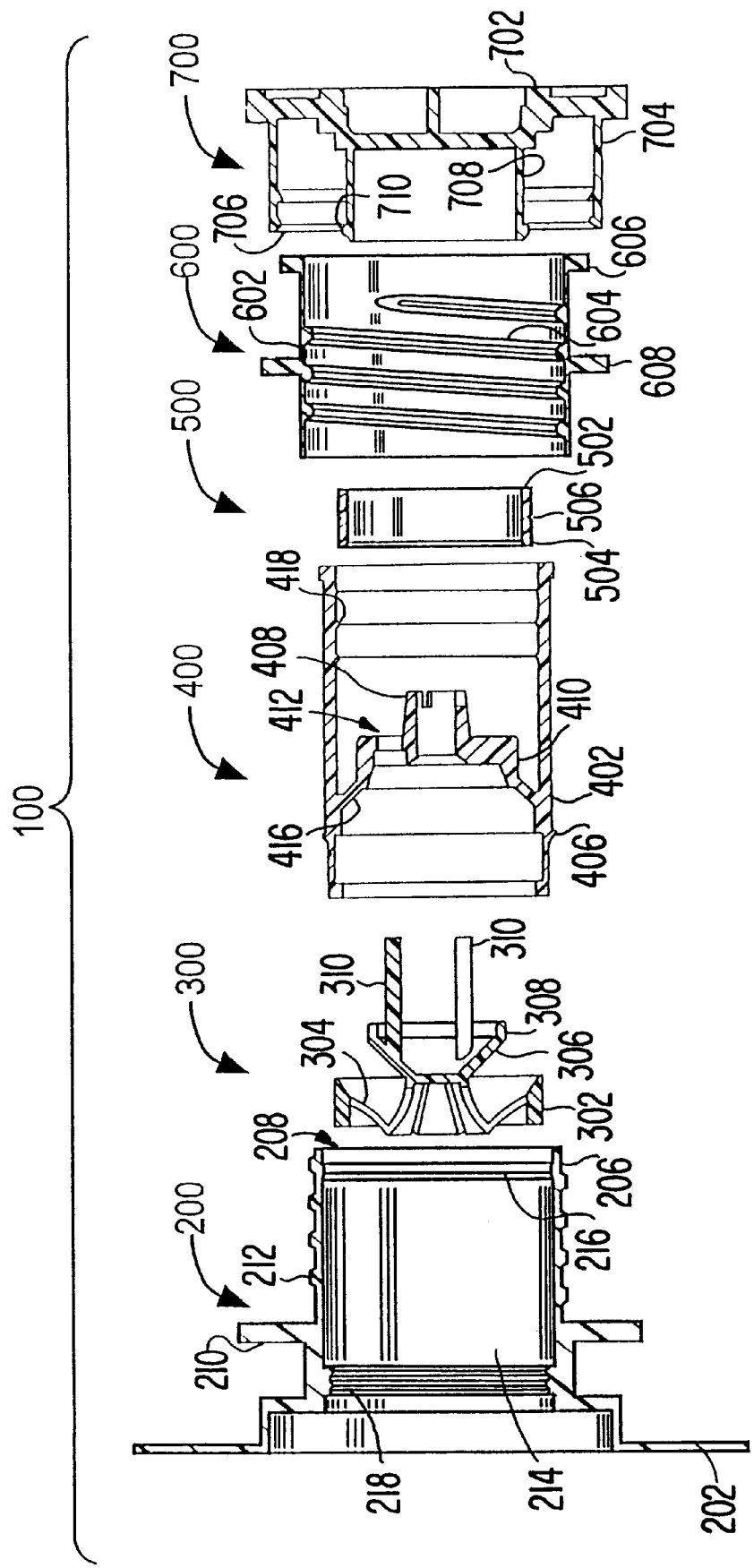
FIG. 3 is an exploded cross-sectional side elevational view of the single-service coupling of the invention.

The illustrated embodiment of the single-service coupling and valve 100 of the invention comprises a fitment 200, a spring poppet 300, a tubular valve member or slider 400, an internal adapter ring 500, an external adapter ring 600 and a protective cap 700, as best seen in FIGS. 2 and 3 which show, respectively, an exploded side elevational view and an exploded side cross-sectional view taken along the line 3—3 in FIG. 1.

Figure 4B:
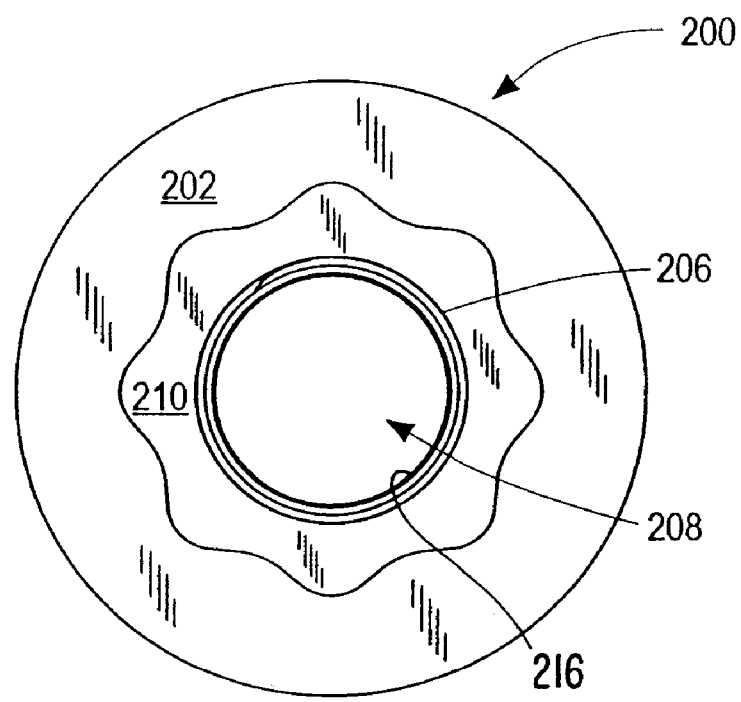
FIG. 4B is a front elevational view of the fitment or spout.
Figure 4A:
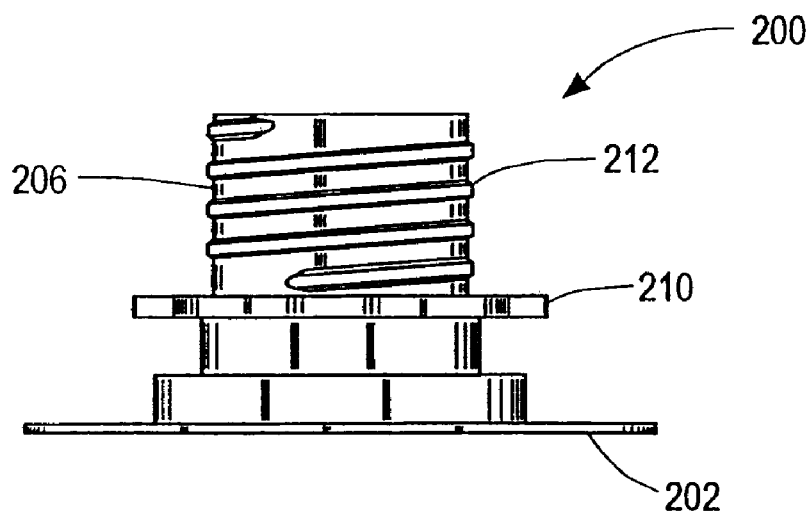
FIG. 4A is a side elevational view of the fitment or spout.
Figure 5B:
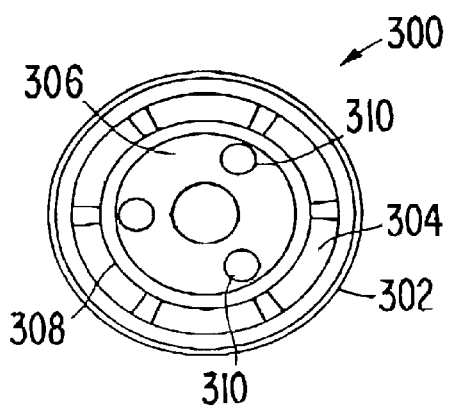
FIG. 5B is a front elevational view of the poppet valve element.
Figure 5A:
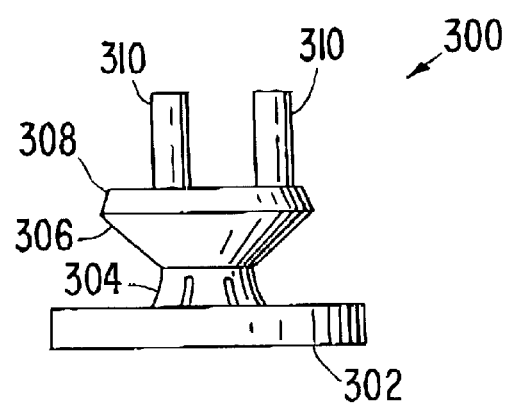
FIG. 5A is a side elevational view of the poppet valve element used in the coupling and valve of the invention.
Figure 5C:
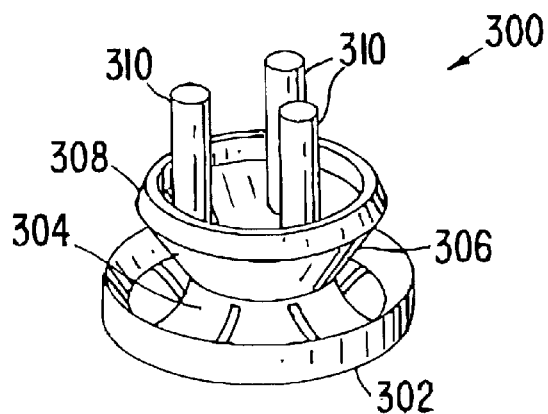
FIG. 5C is a rear elevational view of the poppet valve element.
Figure 6B:
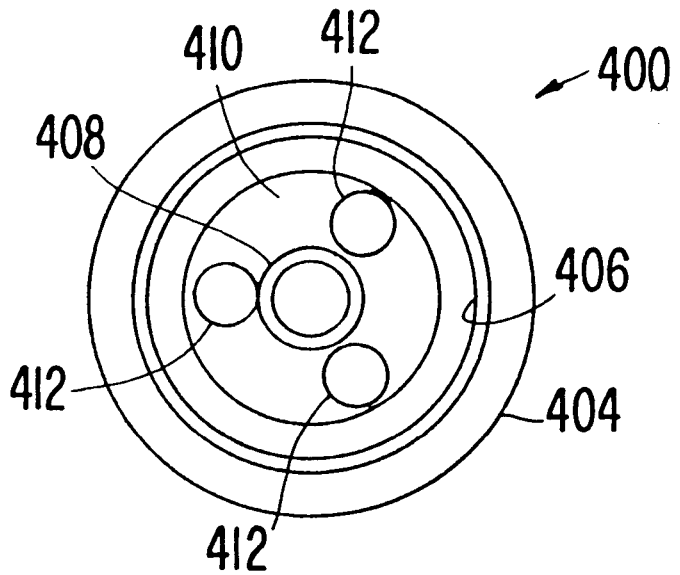
FIG. 6B is a front elevational view of the slider.
Figure 6A:
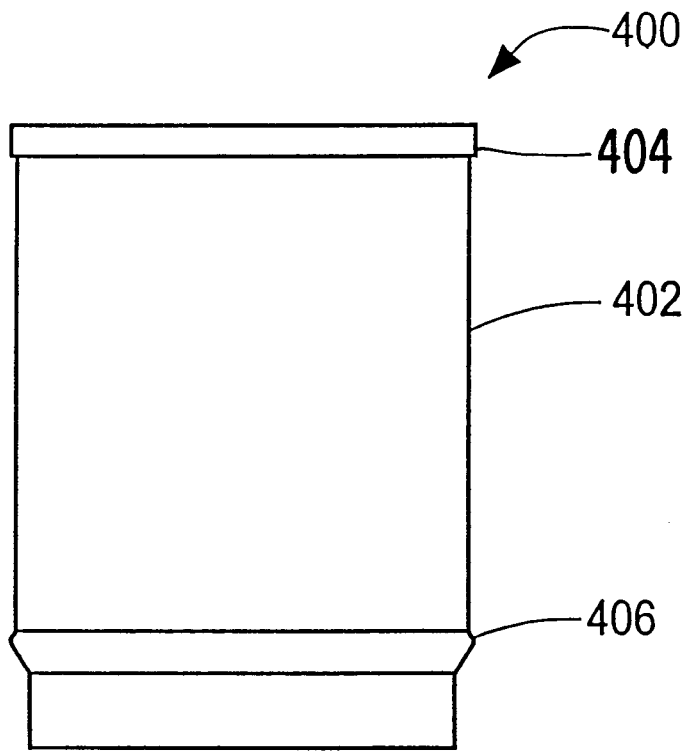
FIG. 6A is a side elevational view of the slider used in the coupling and valve assembly of the invention.
Figure 7B:
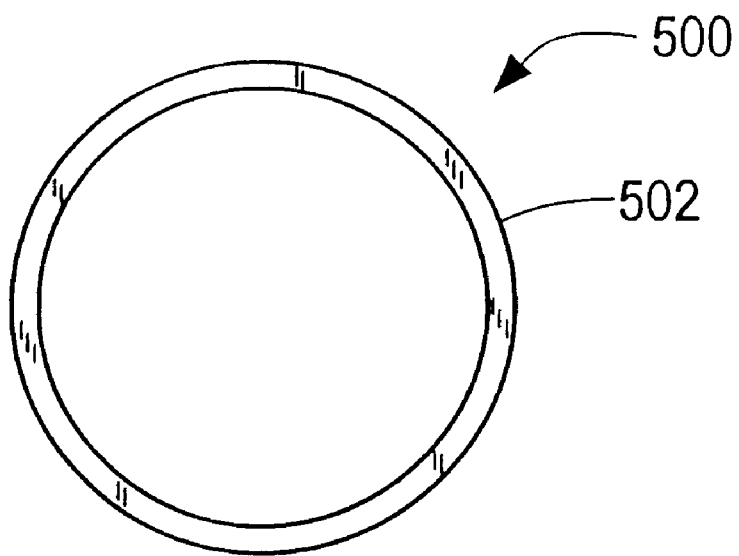
FIG. 7B is a front elevational view of the internal adapter sleeve.
Figure 7A:
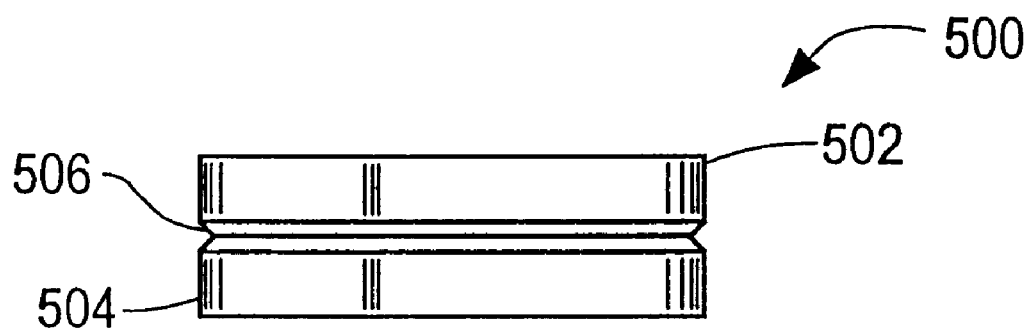
FIG. 7A is a side elevational view of the internal adapter sleeve.
Figure 8B:
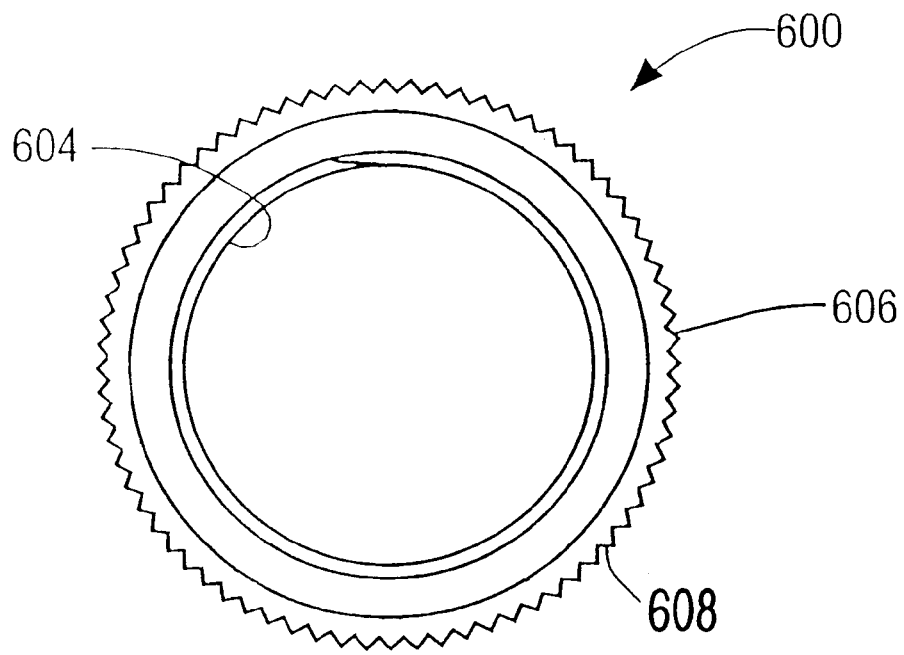
FIG. 8B is a front elevational view of the external adapter ring.
Figure 8A:
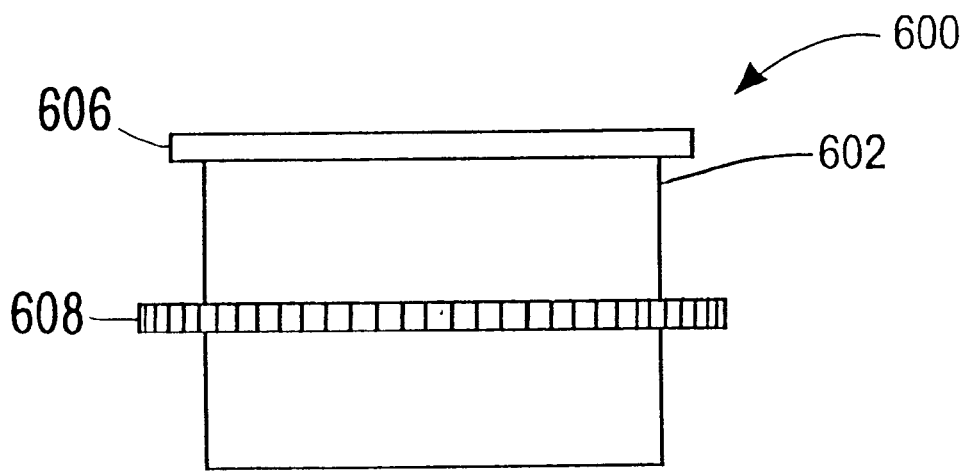
FIG. 8A is a side elevational view of the external adapter ring.
Figure 9A:
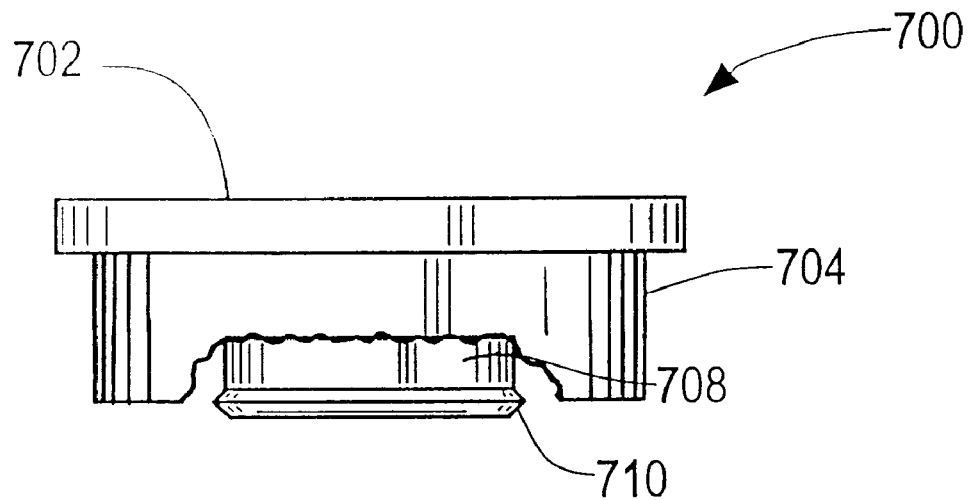
FIG. 9A is a side elevation view of the protective cap.
Figure 9B:
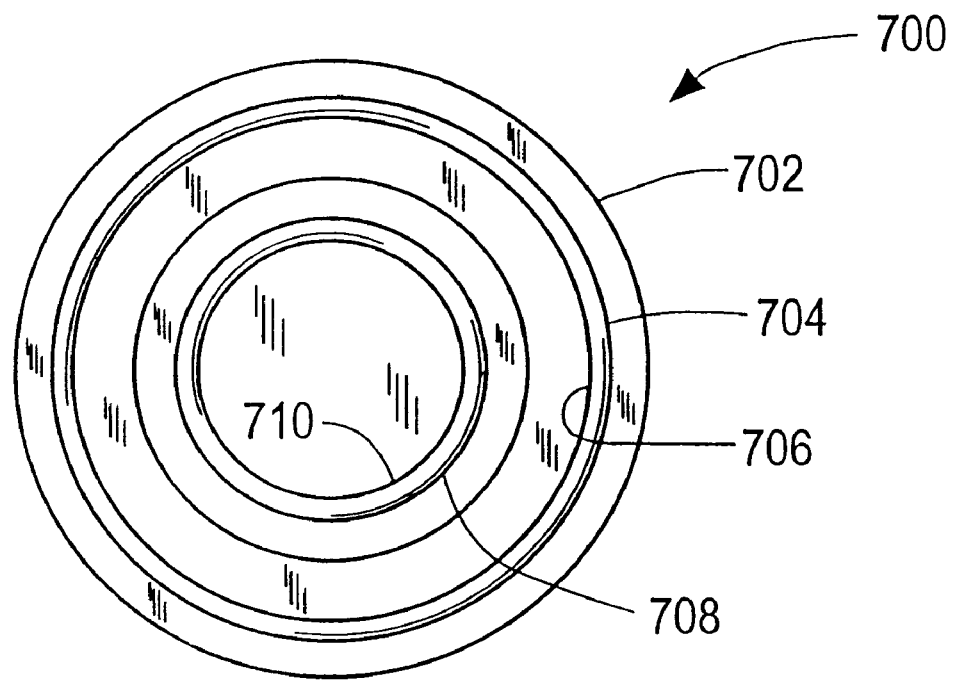
FIG. 9B is a rear elevational view of the protective cap.

The fitment 200 as shown in FIGS. 3, 4A, and 4B comprises a base 202 for attaching the fitment to the sidewall 204 of a container not otherwise shown. The fitment comprises a generally-cylindrical spout 206 surrounding a spout opening 208 and bearing external threads 212 for accepting an external adapter ring 600. The interior surface 214 of the fitment body 206 of the illustrated embodiment bears an integrally molded stop ridge 216 and sealing rings 218. The stop ridge 214 is an optional element and may be omitted in some embodiments of the invention. Although the spout 206 is shown as having a external threads 212 adapted to mate with the connector of a particular liquid dispensing apparatus, as discussed in more detail below, any means of fixing an external adapter ring to the spout 206 is appropriate. In general the spout 206 is provided with external fastening means for accepting the fastening or clamping elements of one or more types of liquid dispensing connectors. For example, the illustrated embodiment of the fitment 200 is provided with a flange 210 for cooperating with a mounting frame of one type of dispensing or service connector, as discussed below.

An external adapter ring is also provided that fits onto the external fastening means of the spout and is capable of accepting the fastening or clamping elements of one or more types of liquid dispensing connectors different from those that are accepted by the spout itself. In the illustrated embodiment the external adapter ring 600 permits the fitment 200 to accept a plurality of different connectors each having different means for fastening the connector to the spout 206.

The slider 400 comprises a generally cylindrical wall 402 provided with a stop ridge 404 at its outer end and a positioning ring 406, both of which serve to limit the motion of the slider at certain stages in the functioning of the coupling and dispensing valve. Within the slider 400 a central tube 408 is supported on the axis of the slider 400 by a support ring 410. The outer end of the central tube 408 is provided with one or more radial slots 420 to facilitate the flow of liquid from the container into a dispensing connector, as discussed below. The support ring 410 is provided with holes 412 through which actuating pins 310 of the valve 300 protrude to engage the probe of a dispensing connector. The support ring 410 also is provided with a valve seat surface 416 against which the valve member 306 of the spring poppet 300 bears when it is in its closed position. A base recess 414 accepts the base ring 302 of the spring poppet 300. The liquid flows from the container through the spout 206 when the spring poppet 300 is forced into its open position by a probe inserted into the coupling and valve 100.

The spring poppet 300 fits within the slider 400. The spring poppet 300 comprises a base ring 302, a plurality of spring members 304, a generally conical valve member 306 having a contact ring 308 that contact the valve seat 416 of the slider 400 when the valve member 306 is in its closed position, and a plurality of actuating pins 310. The base ring 302 of the spring poppet 300 fits within a base recess 414 in the slider 400, and is fixed therein by any conventional means, such as gluing, welding, interference fit, or the like. The actuating pins 310 extend through the holes 412 of the slider 400, and can reciprocate therein. In the illustrated embodiment the spring poppet is biased towards its closed position by a plurality of leaf spring members that extend generally radially from the valve member 306 to the base ring 302. However, any means that will bias the valve toward its closed position can be used in the package connector of the invention. In the normal or closed position the contact ring 308 of conical valve member 306 is held against valve seat 416 by spring members 304 and prevents flow of the liquid contents of the container. When the actuating posts 308 are contacted and depressed by a probe inserted into the coupling as discussed more fully below, the conical valve member 306 moves away from the valve seat 416 allowing the liquid to flow out of the container.

An internal adapter sleeve 500 fits within the slider 400. The internal adapter sleeve 500 of the illustrated embodiment comprises a wall 502 having an outer surface 504 with a circumferential retaining groove 508. The internal adapter sleeve 500 is retained in an initial position by the interference fit of adapter sleeve retaining ring 418 in the retaining groove 506. The internal adapter sleeve 500 may be displaced to a second position by a probe inserted into the coupling as discussed further below. Although less preferred, the internal adapter sleeve 500 may also be designed to be removable to permit the package connector to accept a probe of a different dispensing connector having a larger diameter. It is also possible to omit the internal adapter sleeve and instead configure the inner surface of the wall 402 of the slider 400 to accept and seal a plurality of different dispensing connectors.

An external adapter ring 600 comprises a wall 602 having internal threads 604 that mate with external thread 212 on the spout 206. The illustrated external adapter ring 600 is provided with an end flange 606 located at the external end of the adapter ring 606 for accepting the fastening element of one type of probe usable with the coupling and valve of the invention. The illustrated external adapter ring 600 is also provided with an external flange 608 that cooperates with the mounting apparatus of one or more dispensing connectors to position and support those connectors on the fitment 200. The external adapter ring 600 is threaded onto the spout 206 of the fitment 200 for use with on or more dispensing connectors that have mounting apparatus that interacts with the external adapter ring 600 as discussed below. The external adapter ring 600 may be removed to reveal the treads 212 on the spout 206, whereby the fitment 202 may accept a dispensing connector having a threaded collar.

A cap 700 is provided to protect the coupling and valve and keep it clean during shipping and storage. The cap 700 comprises a cover 702, a skirt 704 bearing an outer retaining ring 706 for retaining the cap on the coupling and valve during shipping, and an internal cylinder 708 bearing an internal retaining ring 710 which holds retains the cap 700 on the slider 400 when the cap 700, slider 400, and poppet 300 are removed as a unit in order to fill the container.

The operation of the connector-valve of the invention is illustrated in FIGS. 10–20.

Figure 10:
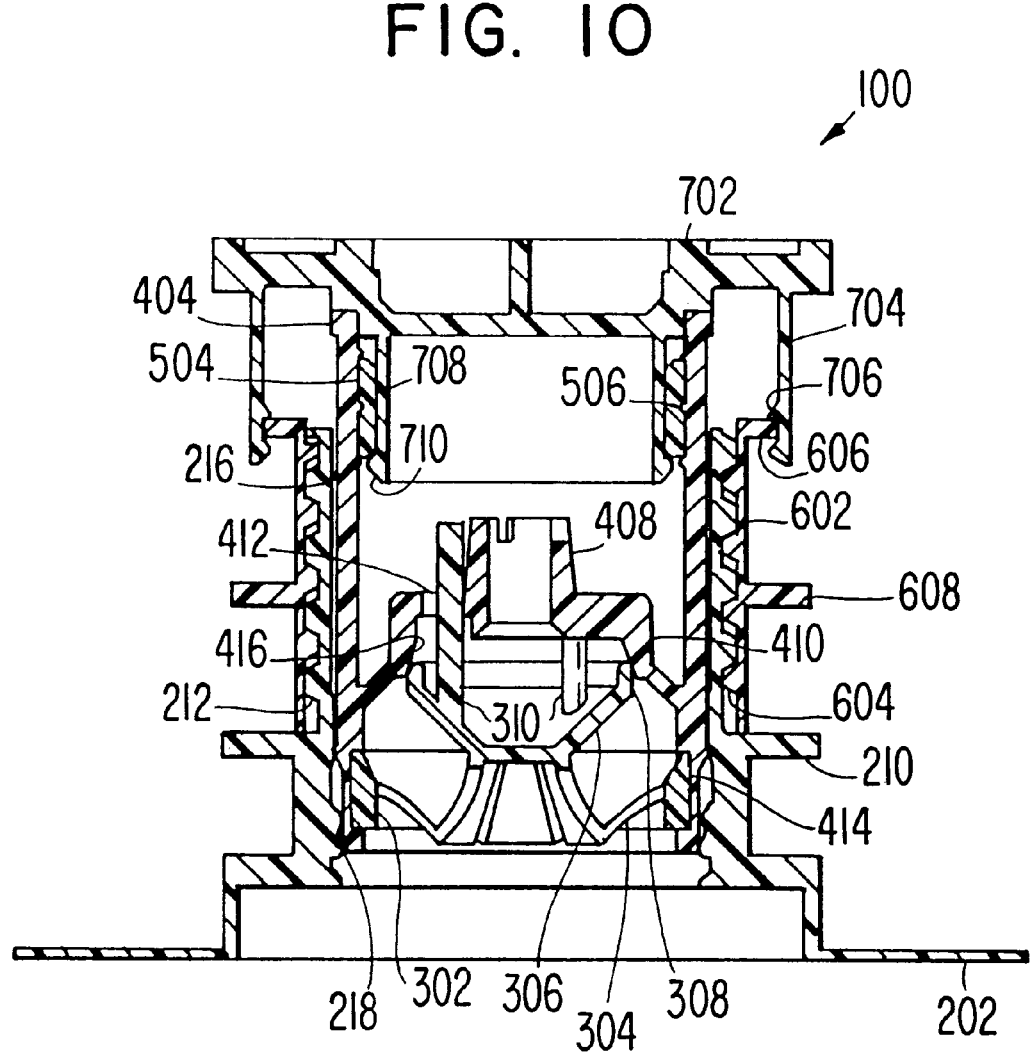
FIG. 10 is a cross sectional view of the coupling and valve assembly of the invention as assembled and fitted to a flexible wall of a container before the container is filled with a liquid or the like to be dispensed.

FIG. 10 shows the connector valve of the invention as assembled after manufacture and fitted to the liquid container before the Container is filled. The slider 400 is inserted into the fitment 200 until the positioning ring 406 abuts the sealing rings 218 of the fitment 200. The cap 700 is retained on the flange ring 600 by means of external retaining ring 706.

Figure 11:
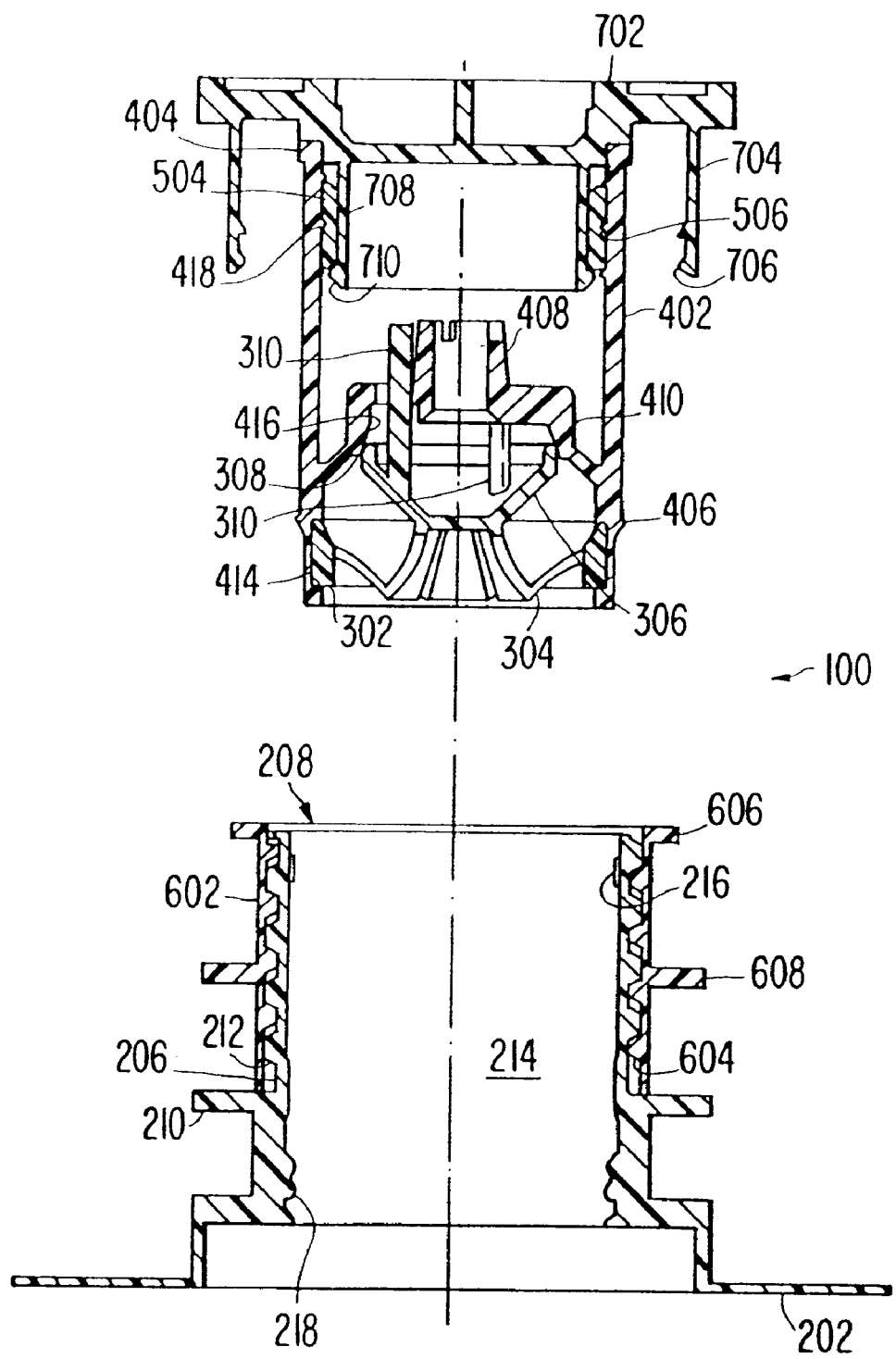
FIG. 11 shows the assembly of cap, slider and adapter ring removed for filling the container through the fitment or spout.

FIG. 11 shows the arrangement for filling the container. The assembly of slider 400, poppet 300, cap 700, and internal adapter ring 500 is removed from the fitment 200 to permit filling of the container through the opening 208.

Figure 12:
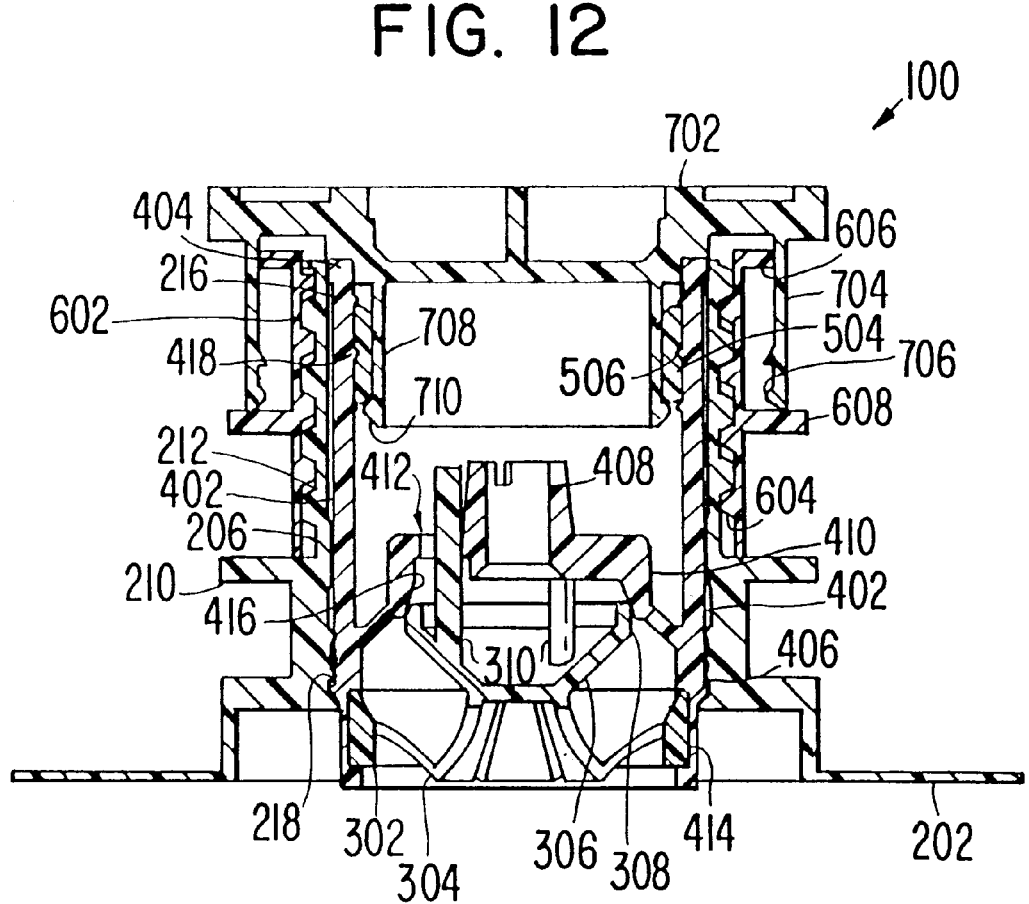
FIG. 12 shows the coupling and valve assembly as assembled after the container is filled for shipping.

FIG. 12 shows the connector-valve assembled after the container is filled with liquid. The slider 400 is inserted to its permanent position within the fitment 200, wherein the positioning ring 406 of the slider 400 is forced past the sealing rings 218 of the fitment 200.

Figure 13:
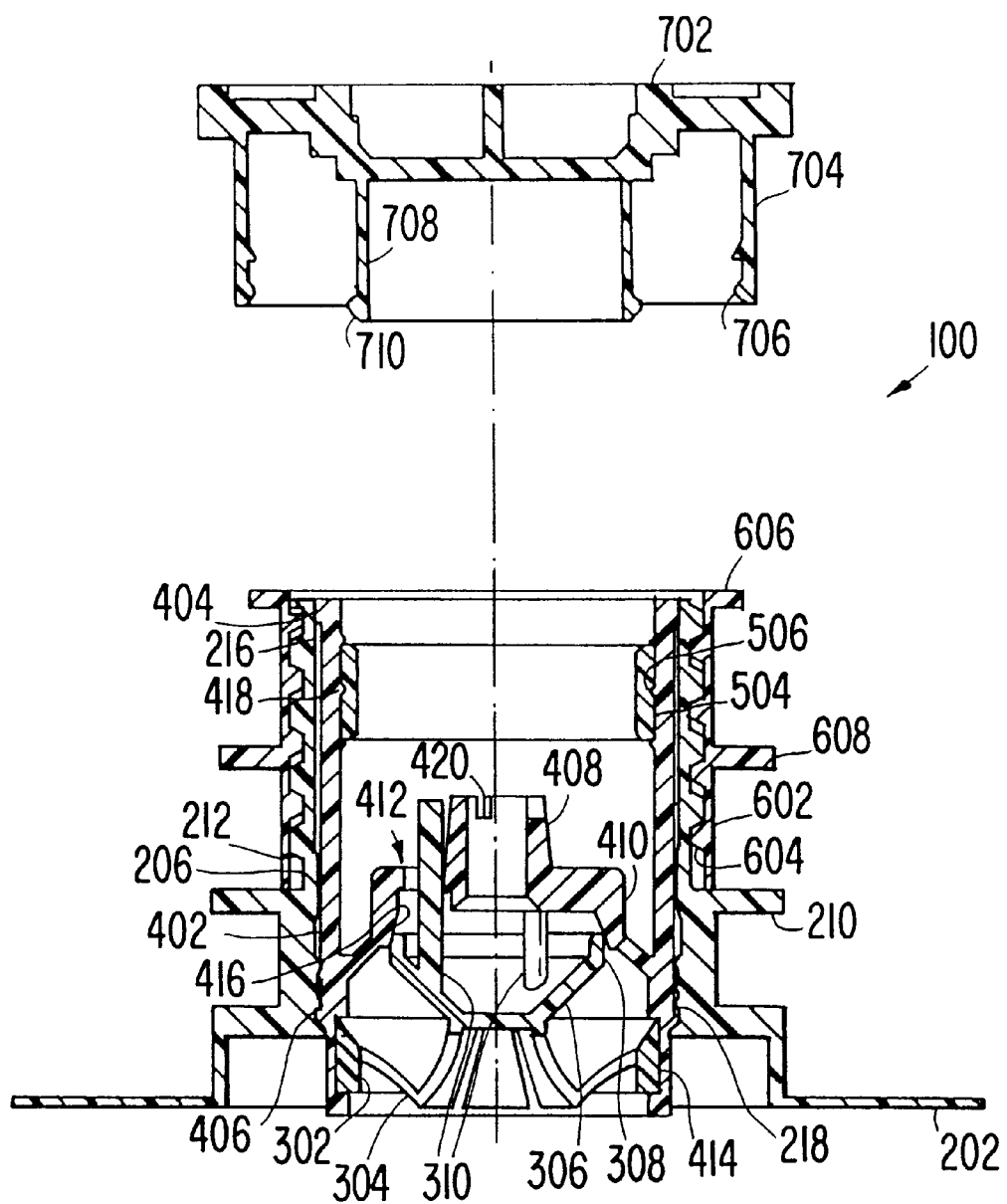
FIG. 13 shows the coupling and valve assembly as prepared for use with certain types of conventional probe for dispensing the contents of the container.

FIG. 13 shows the connector-valve 100 with the cap 700 removed for insertion of certain dispensing system probes. The internal adapter sleeve 500 remains fixed within the slider 400 by means of its retaining groove 506 and the internal adapter sleeve retaining ring 418.

Figure 14:
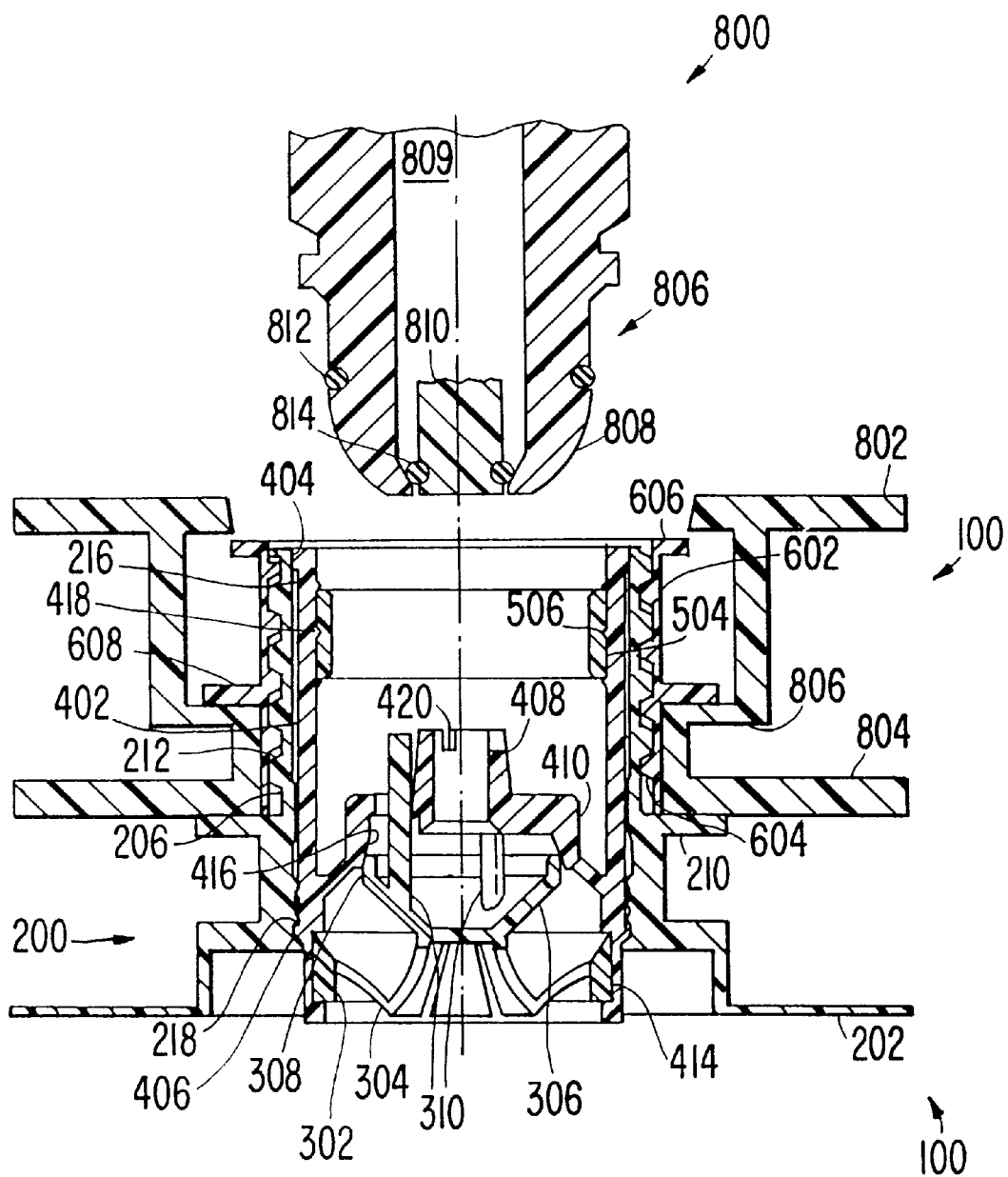
FIG. 14 shows the initial position of one type of probe before insertion into the coupling.

FIG. 14 shows the initial position of one type of connector 800 used with the connector-valve of the invention. An mounting frame 802 is attached to the fitment 200 to provide a means for attaching the support structure, not shown, of probe 808 of the connector 800, to the fitment. The adapter 802 is provided with flanges 804 and 806 that are spaced apart to fit snugly between flange 210 of fitment 200 and flange 608 of external adapter ring 600. The probe comprises a body 808 having a central channel 809 and a valve member 810 as well as sealing O-rings 812 and 814, as well as spring means, not shown, to hold the valve member 810 in its closed position when the probe 808 is not inserted into the connector-valve 200. The internal adapter sleeve 500 is sized to provide a seal with the O-ring 812 surrounding the probe body.

Figure 15:
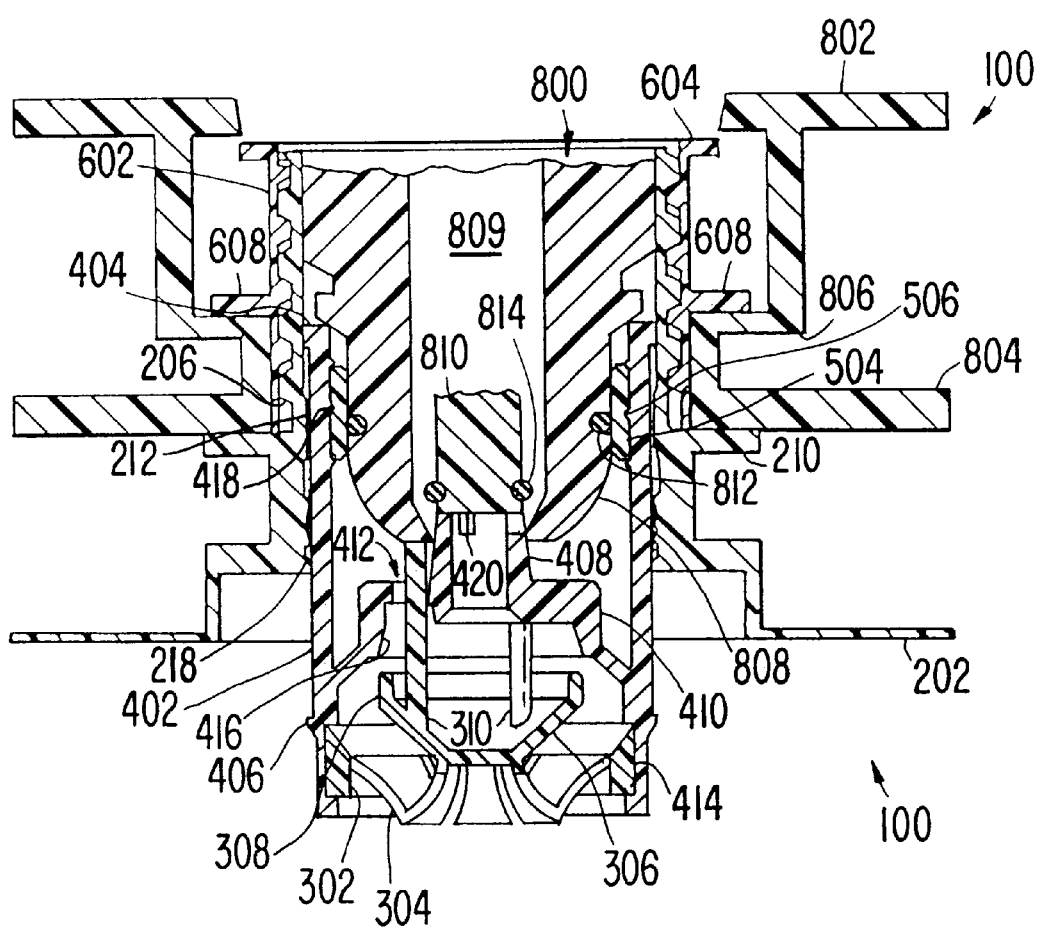
FIG. 15 shows the operating position of the connector shown in FIG. 14.

FIG. 15 shows the probe of FIG. 14 fully inserted into the connector-valve 100. The probe body 808 is sealed within the slider 400 by the-outside O-ring 812 which contacts the internal adapter sleeve 500. The slider 400 is depressed into the liquid container, and the poppet 306 is depressed and the valve opened by the force exerted by the probe body 808 on the actuating pins 310. The valve member 810 of the dispensing connector 800 is opened by contact with the fixed central tube 408 of the slider 400. The liquid can then flow from the container through the open poppet valve 300, the central tube 408 and radial slots 420 and into the central channel 809 of the dispensing connector 800.

Figure 16:
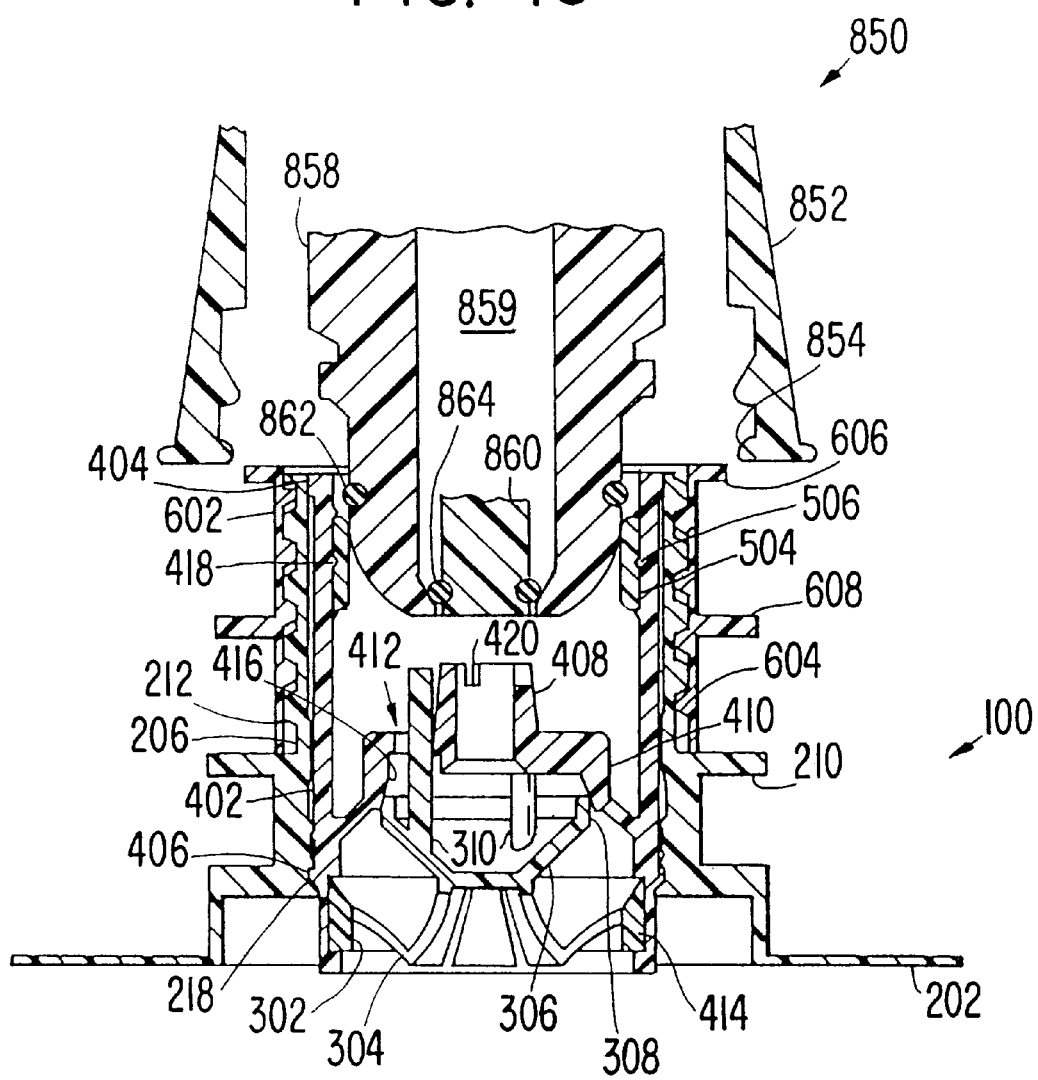
FIG. 16 shows the initial position of a second type of probe before insertion into the coupling and valve assembly.

FIG. 16 shows the initial position of a second type of dispensing connector 850 that can be used with the package connector 100 of the invention. An external support member and clamp 852 has teeth 854 adapted to engage flange 606 of external adapter ring 600. The probe is similar to that shown in FIGS. 14 and 15, and comprises a body 858 having a central channel 859 and a valve member 860, sealing O-rings 862 and 864, as well as spring means, not shown, to hold the valve member 860 in its closed position when the body 858 of the dispensing connector 850 is not inserted into the package connector-valve 100. The internal adapter sleeve 500 is sized to provide a seal with the O-ring 862 surrounding the body 858 of the dispensing connector 850.

Figure 17:
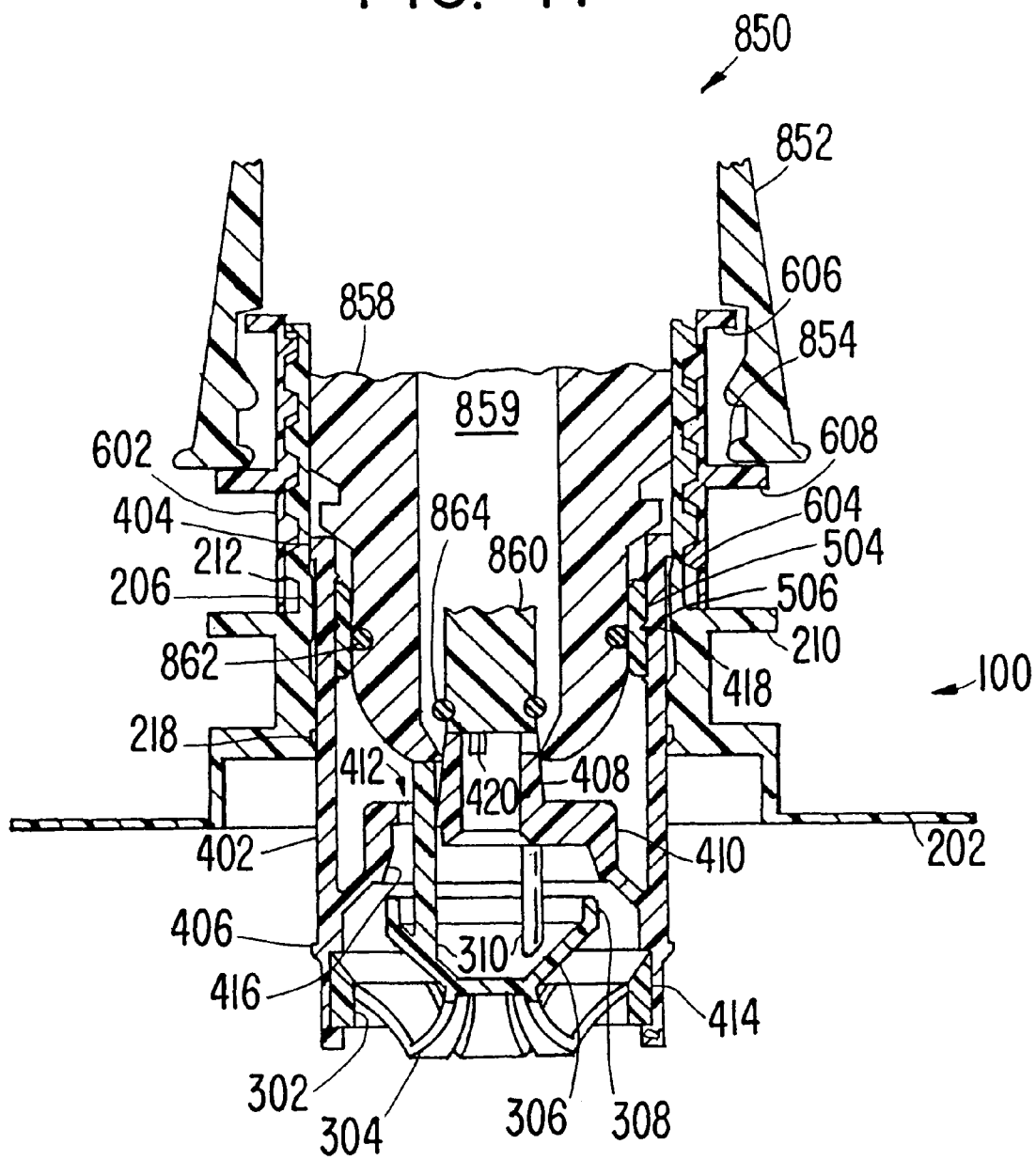
FIG. 17 shows the operating position of the coupling and valve with the probe of FIG. 16.

FIG. 17 shows the dispensing connector 850 of FIG. 16 fully inserted into the package connector-valve 100. The dispensing connector body 858 is sealed within the slider 400 by the external O-ring 862 which contacts the internal adapter sleeve 500. The slider 400 is depressed into the liquid container, and the poppet 306 is depressed and the valve opened by the force exerted by the dispensing connector body 858 on the actuating pins 310. The valve member 860 of the dispensing connector 850 is opened by the fixed central tube 408 of the slider 400. The liquid can then flow from the container through the open poppet valve 300, the central tube 408 and radial slots 420 and into the central channel 859 of the body 858 dispensing connector 850.

Figure 18:
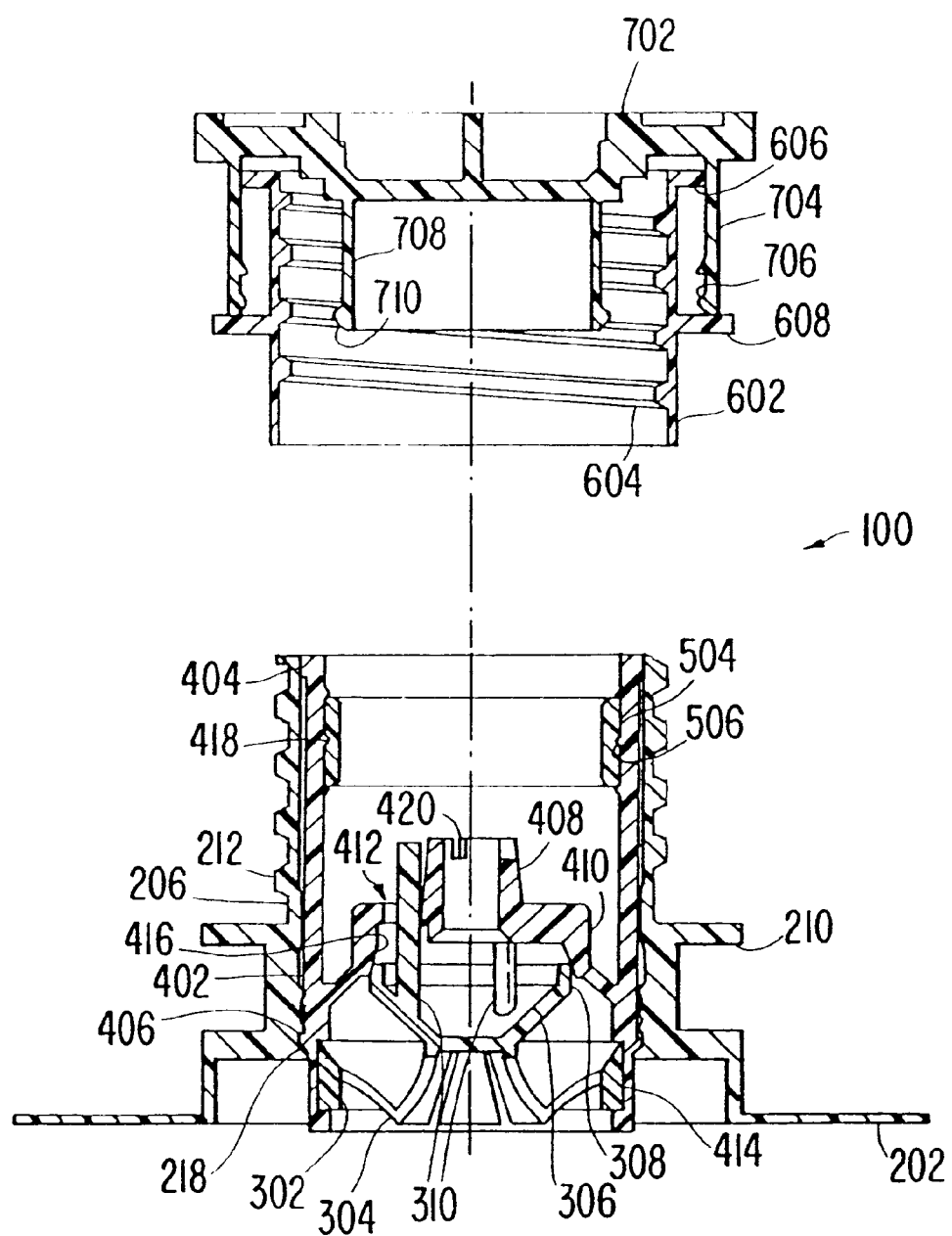
FIG. 18 shows the coupling and valve assembly as prepared for use with another type of conventional probe for dispensing the contents of the container.

FIG. 18 shows the connector-valve as prepared for use with a third type of dispensing connector 900 having a threaded collar 902. The external adapter ring 600 is unthreaded and removed along with the cap 700 and internal adapter sleeve 500.

Figure 19:
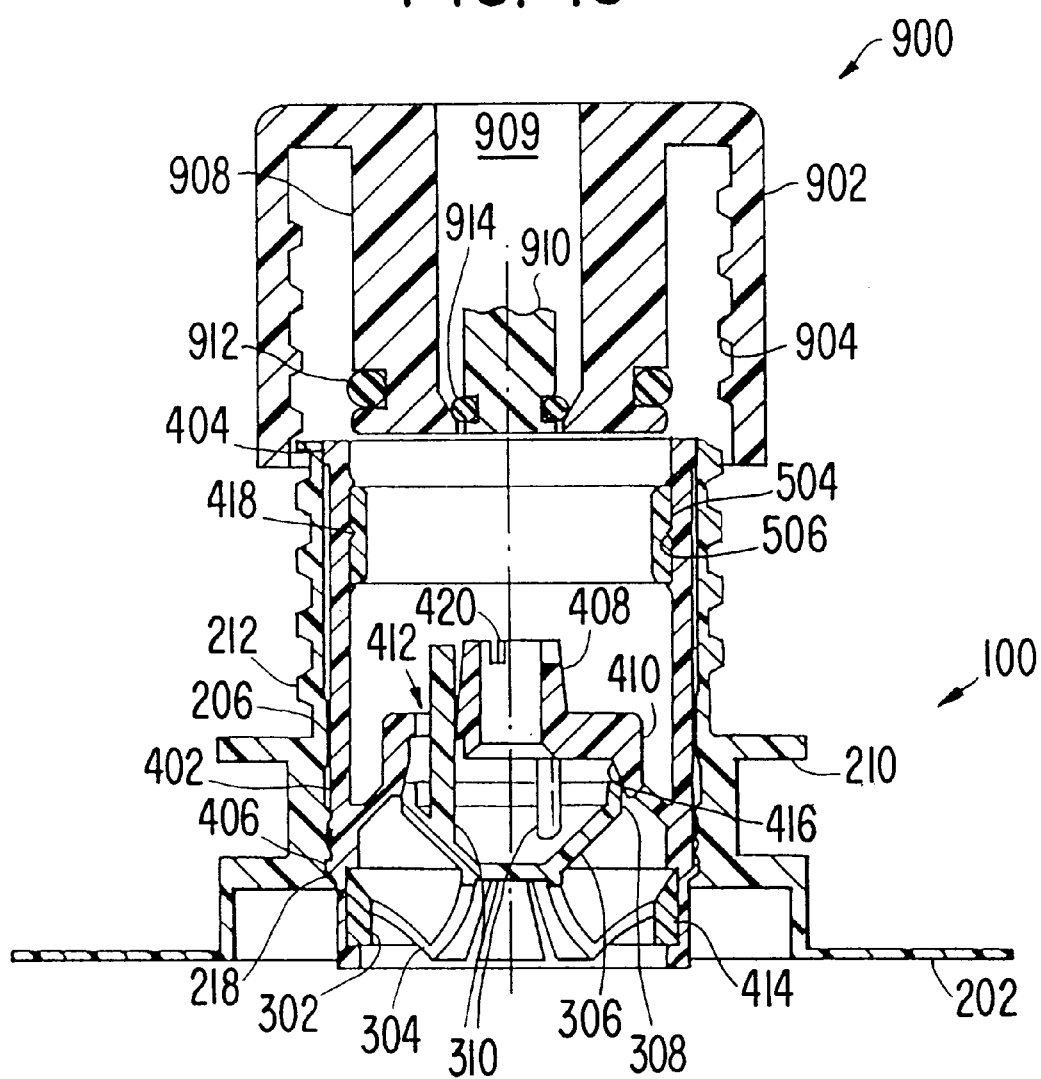
FIG. 19 shows the initial position of the coupling and valve assembly with the probe of FIG. 18.

FIG. 19 shows the initial position of the dispensing connector 900 of FIG. 18. The threaded collar 902, having internal threads 904 is positioned to engage the external threads 212 of the spout 206. The body 908 of the dispensing connector 900 is sized to fit in sealing engagement within the body of the slider 400 without the internal adapter sleeve 500. The body 908 has a central channel 909, and includes a valve member 910 and sealing O-rings 912 and 914, as well as spring means, not shown, to hold the valve member 910 in its closed position when the dispensing connector 900 is not inserted into the package connector-valve 100.

Figure 20:
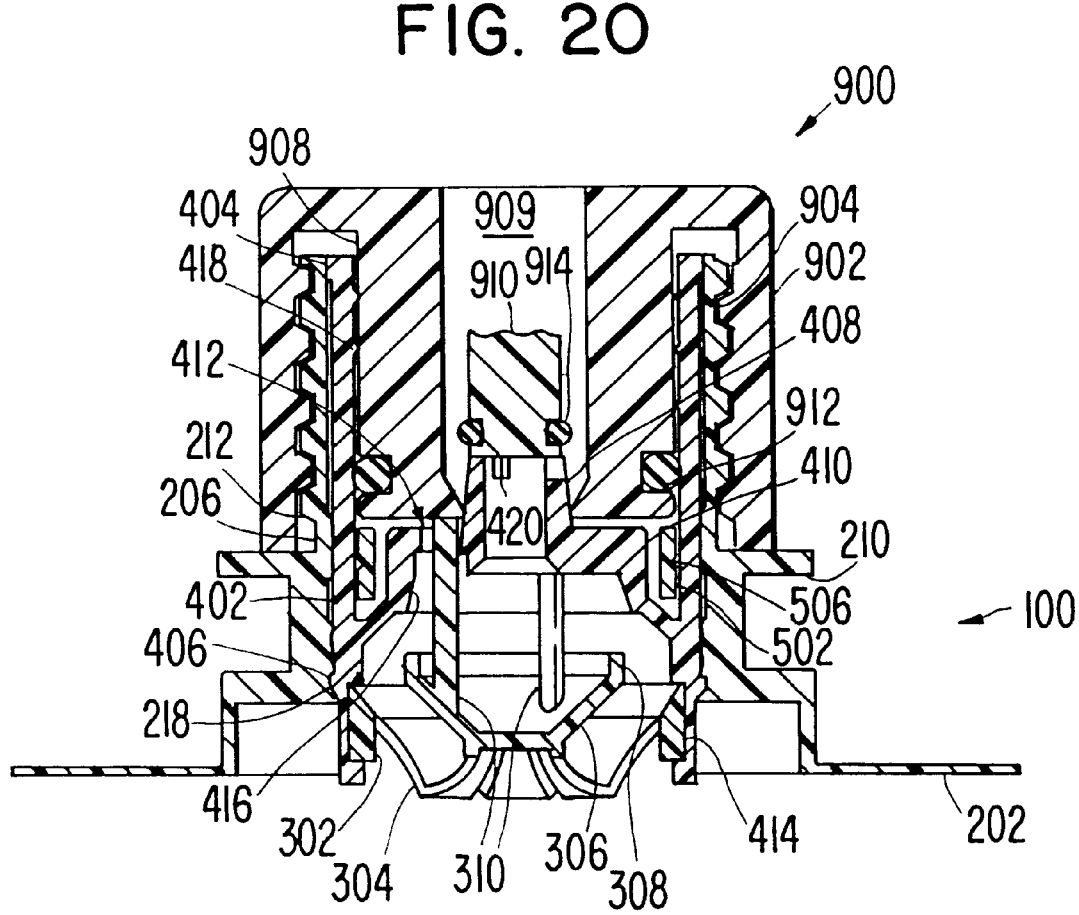
FIG. 20 shows the operating position of the coupling and valve with the probe of FIG. 18.

FIG. 20 shows the dispensing connector 900 of FIG. 19 fully inserted into the package connector-valve 100. The body 908 is sealed within the slider 400 by the outside O-ring 912. The body 908 displaces the internal adapter sleeve 500, which is not needed with the dispensing connector 900, to permit the body 908 to enter the slider 400. The slider 400 is depressed into the liquid container, and the poppet 306 is depressed and the valve opened by the pressure exerted by the force exerted by the dispensing connector body 858 on the actuating pins 310. The valve member 860 of the dispensing connector 850 is opened by the fixed central tube 408 of the slider 400. The liquid can then flow from the container through the open poppet valve 300, the central tube 408 and radial slots 420, and into the central channel 909 of the dispensing connector 900.

In each case when the probe is removed from the package connector-valve 100 the spring members 304 of the poppet 300 force the contact ring 308 of the poppet 300 against the valve seat 416 of the slider 400 to close the valve and prevent leakage from the container. Similarly the spring members of the dispensing connectors operate to seal the valve members of the dispensing connectors.

Although the invention has been described in terms of a particular preferred embodiment thereof, the skilled practitioner will understand that the external adapter ring can have any configuration needed to accept and mount a dispensing connector. Appropriate flanges, grooves, threads, or the like can be formed on the external surface of the adapter ring 600 as required to contact mating elements on a dispensing connector. Similarly, the internal adapter sleeve 500 of the invention may be made of any size needed to seal a given dispensing probe. The internal adapter sleeve 500 may have a plurality of different internal diameters in different axial regions of the sleeve in order to accommodate a plurality of different dispensing connectors. Similarly, the valve arrangement for opening the valve of the package connector of the invention can be of any type that is appropriate for use with a given dispensing connector. The valve can be any type that is actuated by insertion of a probe that is an element of a dispensing connector to be used with the package connector of the invention. In particular, the invention herein described incorporating an external adapter ring and/or an internal adapter sleeve can be used with the package connector disclosed in U.S. Pat. No. 4,421,146 and U.S. Pat. No. 4,445,551, the disclosures of which are hereby incorporated in their entirety into this specification.

The invention having now been fully described, it should be understood that it may be embodied in other specific forms or variations without departing from its spirit or essential characteristics. Accordingly, the embodiments described above are to be considered in all respects as illustrative and not restrictive, the scope of the invention being indicated by the appended claims rather than by the foregoing description, and all changes which come within the meaning and range of equivalency of the claims are intended to be embraced therein.

We claim:

1. A fluid connector for a liquid container comprising
a fitment adapted to be attached to a container for holding a liquid, said fitment comprising
a generally cylindrical spout having an external surface provided with a thread capable of mating with a threaded supporting collar of a first type of dispensing connector;
a generally cylindrical slider movable axially within said spout;
a valve mounted within said slider, said valve having a closed position and an open position, said valve being biased toward said closed position, and being adapted to be moved from said closed position to said open position by insertion of a dispensing connector into said slider;
a removable external adapter ring having internal threads mating with said external threads of said spout and having at least one radially outward extending external flange adapted to contact a supporting clamp of a second type of dispensing connector.

2. The fluid connector of claim 1 wherein said valve is biased towards its closed position by radial leaf spring members.

3. The fluid connector of claim 1 wherein said external adapter ring comprises a second radially extending flange adapted to position said second type of dispensing connector on said adapter ring.

4. The fluid connector of claim 1 further comprising an internal adapter sleeve within said slider, said sleeve having an external diameter adapted to provide a friction fit within said slider and an internal diameter adapted to receive a sealing ring of at least one of said second type of dispensing connector.

5. The fluid connector of claim 4 wherein said internal adapter sleeve is displaceable from a first position within said slider to a second position within said slider by insertion of a probe of the first dispensing connector.

6. The fluid connector of claim 4 wherein said internal adapter sleeve is removable.

7. A fluid connector for a liquid container comprising
a fitment adapted to be attached to a container for holding a liquid, said fitment comprising
a generally cylindrical spout having an external surface provided with a thread capable of mating with a threaded supporting collar of a first dispensing connector;
a generally cylindrical slider movable axially within said spout, said slider having an internal diameter adapted to receive a first dispensing connector;
a valve mounted within said slider, said valve having a closed position and an open position, said valve being biased toward said closed position, and being adapted to be moved from said closed position to said open position by insertion of said dispensing connector into said slider;
an internal adapter sleeve within said slider, said sleeve having an external diameter adapted to provide a friction fit within said slider and an internal diameter adapted to receive a second dispensing connector.

8. A fluid connector for a liquid container comprising
a fitment adapted to be attached to a container for holding a liquid, said fitment comprising
a generally cylindrical spout having an external surface provided with a thread capable of mating with a threaded supporting collar of a first type of dispensing connector;
a generally cylindrical slider movable axially within said spout;
a valve mounted within said slider, said valve having a closed position and an open position, said valve being biased toward said closed position, and being adapted to be moved from said closed position to said open position by insertion of a dispensing connector into said slider;
a removable external adapter ring having internal threads mating with said external threads of said spout and having a pair of radially outward extending external flanges adapted to contact a supporting clamp of a second type of dispensing connector.

9. The fluid connector of claim 1 wherein said external adapter ring comprises a second radially extending flange adapted to position said second type of dispensing connector on said adapter ring and said fitment is provided with a third radially extending flange, said second radially extending flange and said third radially extending flange being spaced to accept an adapter for mounting a third type of dispensing connector.

* * * * *